Figure 1:
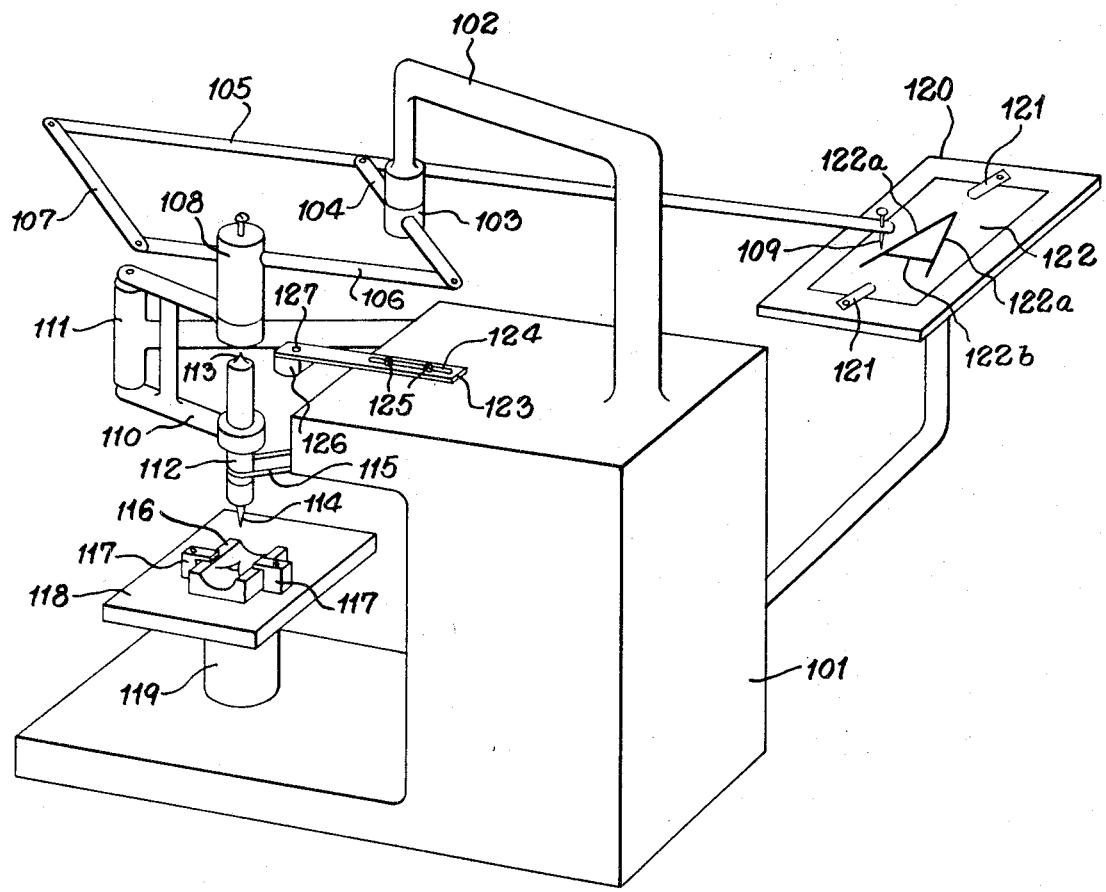

United States Patent

[11] 3,548,710

| [72] | Inventor | Morton S. Kaplan<br>Miami, Fla. |
|---|---|---|
| [21] | Appl. No. | 765,864 |
| [22] | Filed | Oct. 8, 1968 |
| [45] | Patented | Dec. 22, 1970 |
| [73] | Assignee | Micro-Thermal Application, Inc.<br>Hialeah, Fla.<br>a corporation of Delaware |

[54] FORMING APPARATUS AND PROCESS
13 Claims, 11 Drawing Figs.

[52] U.S. Cl. .................................................. 90/13.1;
33/22, 33/25
[51] Int. Cl. ..................................................... B23c 1/16,
B43l 13/10
[50] Field of Search ............................................. 90/13.1;
33/25A, 23A, 22, 24-A, 24-C, 18-B

[56] References Cited
UNITED STATES PATENTS
| 2,067,867 | 1/1937 | Taylor ........................ | 33/22-X |
| 2,733,642 | 2/1956 | Beatty et al. ................ | 33/25(A)-X |

*Primary Examiner*—Gil Weindenfeld
*Attorney*—Ryder, McAulay & Hefter

ABSTRACT: An improved apparatus and process for cutting a pattern into a workpiece by tracing a two-dimensional pattern layout. The cutting member is guided in a vertical direction to control the curvature of the cut imparted to the workpiece by means of a forming guide. The forming guide is provided with a plurality of faces thereon and/or numerous degrees of movement to enable selection of different faces or contours to engage the cutting means.

INVENTOR
MORTON S. KAPLAN
BY
ATTORNEYS

INVENTOR
MORTON S. KAPLAN
ATTORNEYS

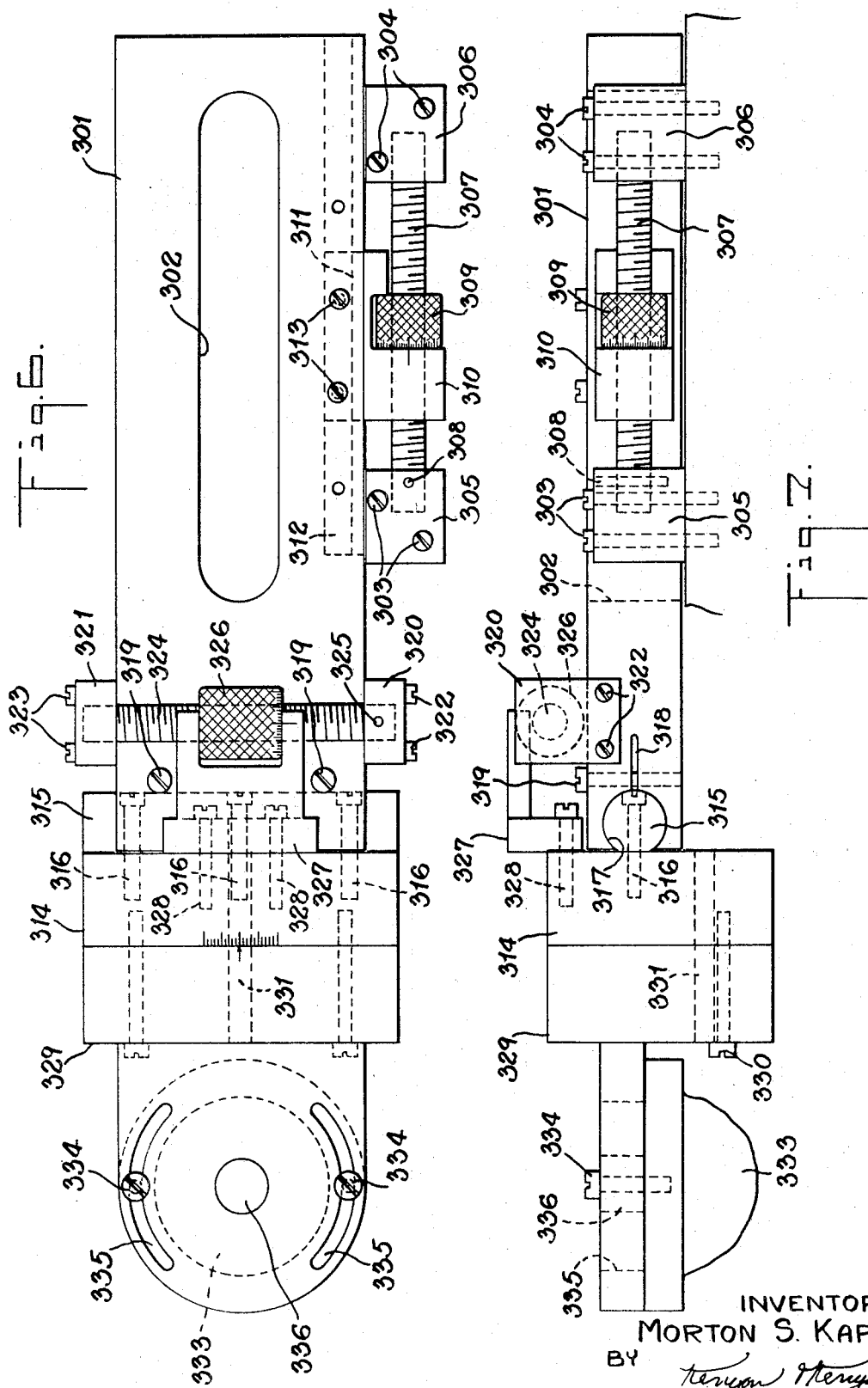

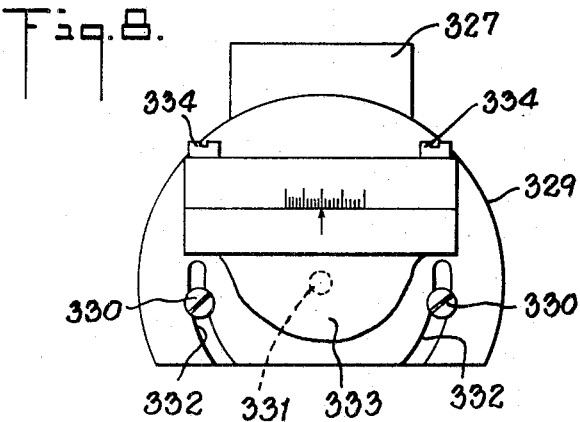
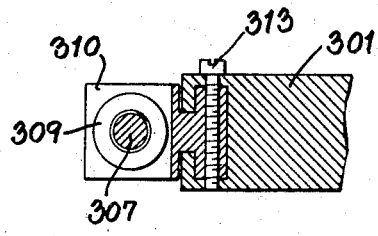
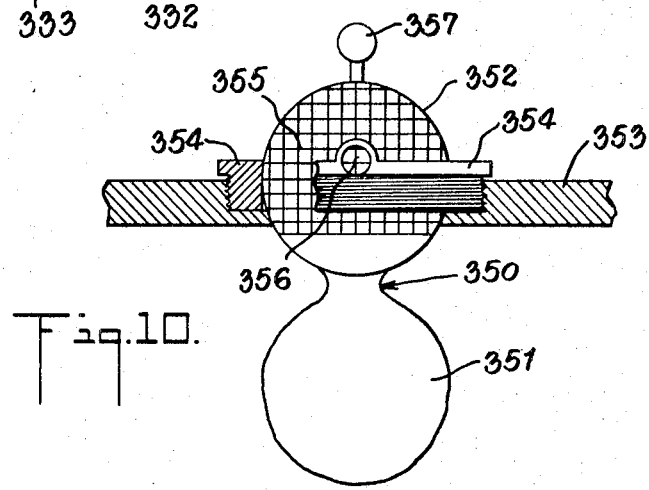
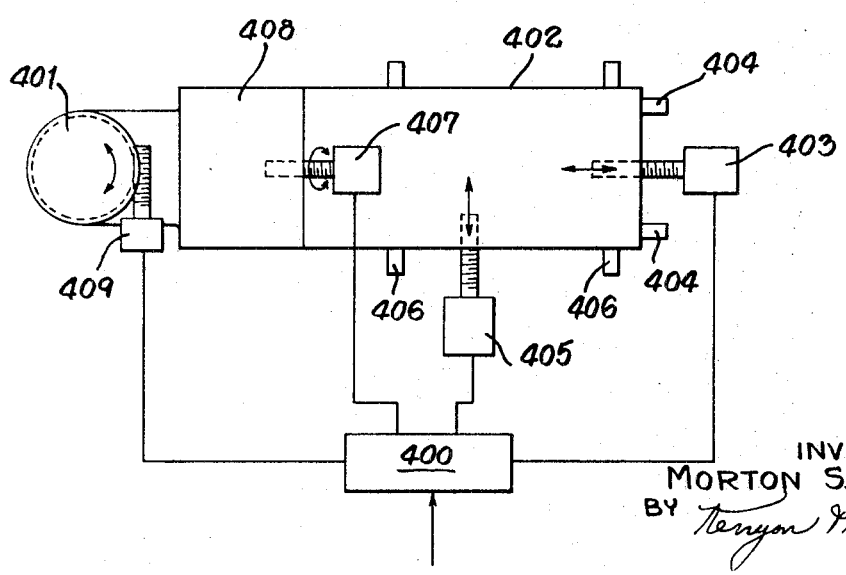

FORMING APPARATUS AND PROCESS

THE INVENTION

This invention pertains generally to an improved pantomill and its method of operation and more particularly to an adjustable means and forming guide for controlling the curvature of the cut imparted to the workpiece.

Pantomills of the general type described herein are frequently utilized to impart a variety of designs, some being particularly complex, into a workpiece. In addition to a two-dimensional pattern traced by a stylus, a guide means may be used to control the depth of the cut imparted to a three-dimensional workpiece. This machine is conventionally referred to as a two-dimensional pantomill and is characterized by the use of a flat pattern having only score lines thereon. In contrast to this, a three-dimensional pantomill has an additional arm which is used to follow the curvature of a three-dimensional pattern. Prior art methods on the two-dimensional pantomill required the use of guiding means shaped identically to that of the workpiece. As different shaped workpieces were utilized, or as different contoured surfaces of the workpiece were being cut, changing the guiding means became necessary. Often, guide means having the desired contoured surfaces were not available and the time and expense of making them would be prohibitive. Therefore, complex patterns had to be made on a three-dimensional pantomill, which is costlier, more difficult to operate and requires the use of an exact model of the object which is to be formed.

Briefly, the invention disclosed herein provides a guiding means having a plurality of faces with differing contours thereby eliminating the necessity of stocking a number of guide means and also eliminating extensive machine downtime. Further, means are provided to facilitate adjustment of the guide means and permit up to four degrees of movement thereof in order to change the contour engaging the cutting means.

Accordingly, it is an overall object of this invention to provide an improved pantomill and a method of operation to readily adjust the contour of the guide means engaging the cutting tool.

Another object of this invention is to provide a pantomill having thereon a guide means with a plurality of faces.

Figure 2:
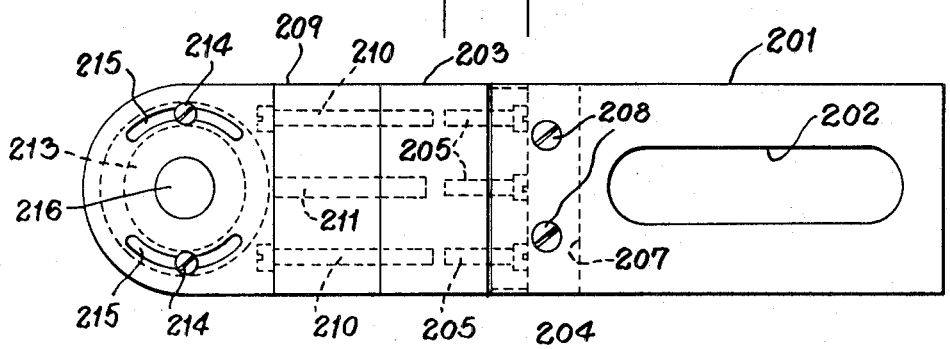
Figure 3:
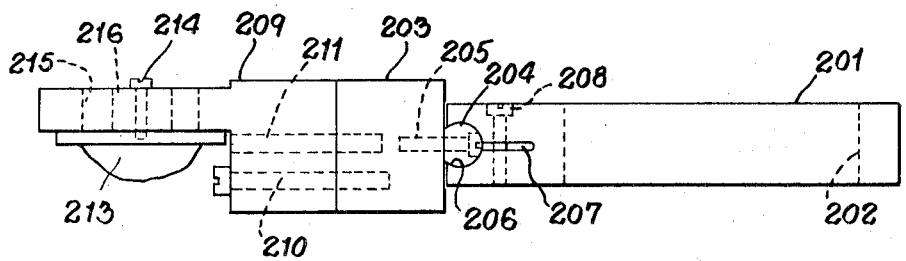
Figure 4:
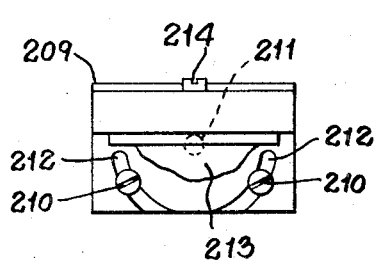
Figure 5:
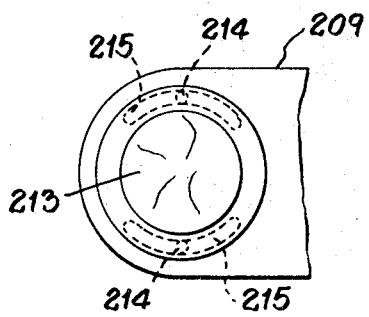

These and other objects, advantages and features of the invention will become more apparent from the following description taken in conjunction with the accompanying drawing wherein:

FIG. 1 shows a pantomill in general outline;
FIG. 2 is the top view of a first embodiment of a guiding bar;
FIG. 3 is a side view of the first embodiment of a guiding bar;
FIG. 4 is a front view of the first embodiment of a guiding bar;
FIG. 5 is a bottom view of the head of the first embodiment of a guiding bar;
FIG. 6 is a top view of a second embodiment of a guiding bar;
FIG. 7 is a side view of the second embodiment of a guiding bar;
FIG. 8 is a front view of the head of the second embodiment of a guiding bar;
FIG. 9 schematically illustrates the tongue and groove arrangement of the second embodiment of a guiding bar;
FIG. 10 is an enlarged fragmentary front view of the forming guide; and
FIG. 11 is a schematic view of the guiding bar with automated driving means.

The pantomill includes a base 101 having a rigid overhanging arm 102. The arm 102, through collar 103, slidably supports ratio arm 104. The ratio arm 104 may be moved throughout its length through collar 103, and locked in various positions with respect to arm 102. Ratio arm 104 is pivotally connected to tracer arm 105. Follower arm 106 also is pivotally connected to ratio arm 104. Connecting arm 107 is pivotally connected to each of arms 105 and 106. Collar 108 is slidably attached to follower arm 106. The follower arm 106 may be moved throughout its length through collar 108 and locked in various positions with respect thereto. Attached to the extremity of tracer arm 105 is a stylus 109. The four pivotally connected arms 104, 105, 106 and 107 comprise a pantograph in which a pattern formed by movement of stylus 109 is reproduced on a reduced scale by points along tracer arm 106 in accordance with parameters well known in the art. By adjustment of arms 104 and 106 within collars 103 and 108 the amount by which a pattern traced by stylus 109 is reduced by arm 106 can be controlled.

In the pantomill the pattern traced by stylus 109 is reproduced by the point of a cutting tool by attachment through collar 108. A generally U-shaped arm 110 is pivotally attached at its upper end to collar 108. The U-shaped arm 110 is supported at one end of bar 111 by a pivotal arrangement, and the other end of bar 111 is pivotally attached to base 101. The lower end of U-shaped arm 110 holds spindle 112 which rotates freely within arm 110 and is capable of limited vertical movement therein. At the top of spindle 112 there is a guiding point 113, the function of this fixed point is explained in detail below. The bottom of spindle 112 contains a releasable mechanism (not shown) which holds cutting tool 114. The spindle 112 is driven by a belt 115 which is attached to a motor (not shown).

The cutting tool 114 is shown positioned over a metal plate 116 held in place by locking tabs 117 or a vise (not shown). The plate 116 rests on work table 118, which has position adjusting means (not shown), and is on support 119. A copy table 120, positioned beneath stylus 109, is provided with locking tabs 121 to hold a scored pattern 122.

The operation of the pantomill proceeds as follows. A scored pattern is fixed on the copy table. The scoring is sufficiently deep to accurately and securely permit the stylus to follow the design, which as shown is an A. The operator places the stylus at a particular point on the design, such as at the top of the A, and then loosely affixes the metal member which is to be engraved, on the work table. The metal member is aligned by lowering the cutting tool (by a lever, not shown) and adjusting the position of the metal member to where it is desired to have the top of the A which will be engraved thereon. The metal member is then locked in place. As the operator holds the stylus on the scored pattern and follows the design, the movement of the stylus, transmitted through the follower arm, is duplicated on the tracer arm. The cutting tool, which maintains its position at all times below the collar on the tracer arm, repeats on a reduced scale the design traced by the stylus. Although the cutting tool remains fixed in relation to the tracer arm the U-shaped bar is capable of pivoting and the entire U-shaped bar-spindle combination pivots about the fixed point on the base.

The combination of means described above permits movement of the cutting tool in a plane to duplicate the movement of the stylus. The use of a guiding bar 123 permits vertical movement of the cutting tool as it is engraving or cutting the metal member. The guiding bar 123 can be moved horizontally along the groove 124 and locked in place with bolts 125. Attached to the end of guiding bar 123 is a solid convex forming guide 126 locked in place by bolt 127. To engrave a design in a concave metal member, the guiding bar 123 is extended until the forming guide 126 is positioned over the guiding point 113. As the spindle 112 (which is upwardly biased by a spring means, not shown) follows the pattern of the stylus in a horizontal plane, the spindle will simultaneously move vertically as the guiding point 113 maintains contact with the convex surface of the forming guide 126. The forming guide has always been the exact opposite of the work or metal member. For instance, if the work is convex, the forming guide was concave and its contour was matched precisely with the part to be engraved.

A first embodiment of an improved guiding bar is illustrated in FIGS. 2 through 5. The guiding bar body 201 has a groove 202 therein similar to the guiding bar of FIG. 1 to mount the bar on the base of a pantomill. The guiding bar has a middle section 203 adapted to move perpendicularly to the axis of the groove 202. A cylindrical bar 204 is fixed to middle section 203 by means of screws 205. The bar 204 fits within the mating groove 206 which leads into slit 207. Screws 208, through slit 207, tighten groove 206 about bar 204 to fix the position of middle section 203 with respect to body 201. Head section 209 is attached to middle section 203 through screws 210, and centrally positioned pin 211 around which section 209 can pivot in relation to section 203. Arcuate grooves 212 permit limited rotational movement of head section 209 to a desired position which is secured by screws 210. A forming guide 213 is attached to the forward position of head section 209 by screws 214 through arcuate grooves 215. The grooves 215 permit limited rotational movement of forming guide 213 around pin 216 in combination with the locking screws 214.

It is clear from the above that the guiding bar of FIGS. 2 through 5 has several additional degrees of freedom of movement when compared to the conventional embodiment of FIG. 1. The guiding bar 123 of FIG. 1 can be moved only along the line defined by the axis of its groove 124. The improved guiding bar of FIGS. 2 through 5 can be moved (1) along the line defined by the axis of its groove 202, (2) along an axis perpendicular to the axis of said groove, as defined by the axis of bar 204 and (3) around the axis defined by pin 211, as defined by the limits of rotation in grooves 212. In addition, the forming guide can be rotated around the axis of pin 216, as defined by the limits of grooves 215.

As noted above the forming guide as previously used was fixedly positioned above the work during the engraving and was required to be of the exact shape of the work to be engraved. With the improved guiding bar, the forming guide has four degrees of freedom and thus is capable of a different mode of operation than that previously employed. The forming guide of the present invention has a multitude of different faces which can be placed in contact with the guiding point during the engraving operation. This greatly enlarged flexibility in the pantomill permits work to be performed more economically and rapidly and leads to its automation.

A second embodiment of an improved guiding bar is shown in FIGS. 6 through 9. The guiding bar body 301 has a groove 302 therein similar to the previously discussed embodiments to mount the bar on the base of a pantomill such as that of FIG. 1. However, for fine adjustment the bolts through the groove 302 are loosened and screws 303 and 304 are secured into the base of the pantomill. The screw pairs 303 and 304 are in blocks 305 and 306, respectively. These blocks are not attached to the body of the guiding bar. Block 305 has one end of large screw 307 fixed therein by means of pin 308. The other end of screw 307 fits into block 306. A knurled ring 309, has internal screw threads which mesh with screw 307. As the knurled ring 309 is turned it carries collar 310 along with it. Collar 310 fits around screw 307 and abuts ring 309 on both sides thereof. The collar 310 slidably engages body 301 through a key and groove arrangement of the type shown in FIG. 9. The necked-down portion 311 of collar 310 expands into a key portion which fits into groove 312 along the length of body 301. The collar 310 is secured to the body 301 by means of screws 313. Thus rotation of the knurled ring controls the movement of the guiding bar through the collar, in a direction along its major axis. As shown, the knurled ring and collar are scored to provide reference marks for more accurate control.

The guiding bar has a middle section 314 adapted to move perpendicularly to the axis of groove 302. A cylindrical bar 315 is fixed to the middle section 314 by means of screws 316. The bar fits within the mating groove 317 which leads into slit 318. Screws 319, through slit 318, tighten groove 317 about bar 315 to fix the position of middle section 314 with respect to body 301. For fine adjustment of the middle section the screws 319 are loosened and a mechanism similar to that previously described is employed. Blocks 320 and 321 are secured to each side of the body 301 by means of screw pairs 322 and 323, respectively. Block 320 has one end of large screw 324 fixed therein by means of pin 325. The other end of screw 324 fits into block 321. A knurled ring 326 has internal screw threads which mesh with screw 324. As the knurled ring 326 is turned it carries collar 327 along with it. Collar 327 fits over screw 324 and abuts ring 326 on both sides thereof. The collar 327 is secured to middle section 314 by screws 328. Thus rotation of the knurled ring controls the movement of the middle section in a direction perpendicular to the major axis of the guiding bar. As shown, the knurled ring and collar are scored to provide reference marks for more accurate control. Head section 329 is attached to middle section 314 through screws 330 and centrally positioned pin 331 around which section 329 can pivot in relation to section 314. Arcuate grooves 332 permit limited rotational movement of head section 329 to a desired position which is secured by screws 330. The knurled ring 326 and collar 327 are scored to provide reference markings for more accurate control.

A forming guide 333 is attached to the forward portion of head section 329 by screws 334 through arcuate grooves 335. The grooves 335 permit limited rotational movement of forming guide 333 around pin 336 in combination with the locking screws 334. As shown in FIG. 8, the front of head 329 and forming guide 313 are scored to provide reference marks.

The operation of the embodiment of FIGS. 6 through 9 is as follows. The operator starts with a scored pattern 122 shown in FIG. 1. Either a model, sketch, or written directions may be used as a reference point to indicate the curvature which is desired for the final casting to be made from the milled mold. Two different curvatures, for example, may be required for the long arms 122a and the short arm 122b on the scored pattern. At least one of these curves differ from the shape of the blank metal mold. The required curve or curves necessary to form, respectively, 122a and 122b are located by the operator on the forming guide, either visually or by means of reference charts. The reference chart may be a topographical map of the multifaced forming guide. The stylus is positioned at a reference point on the scored pattern and the appropriate surface on the forming guide is moved over the guiding point. This movement of the forming guide is accomplished by the means set forth above for moving the guiding bar along its major axis, perpendicular thereto, or by rotation of the guiding bar head or the forming guide. After the forming guide is properly positioned the metal member which is to be formed is placed in its proper location beneath the cutting tool. During the forming operation the forming guide may be repositioned to change the curvature being cut. This repositioning is facilitated by the micrometer-type markings on members 309, 314, 326 and 329.

A particular advantage of the present invention is that the surfaces of the forming guide do not have to correspond to the shape of the metal member being formed or the curvatures which are desired in this member. For example, if the forming guide does not have a surface which exactly corresponds to the curvature for 122a the desired curvature may be obtained by the use of one or more surfaces of the forming guide coupled with movement of the forming guide during the cutting process. This is achieved by simultaneous, or stepwise, movement of the stylus coupled with movement of the forming guide. This has made possible the cutting of any conceivable surface without the necessity of individual forming guides having a corresponding surface of exactly the same shape and size.

An alternate means for imparting freedom of motion to the forming guide is illustrated in FIG. 10. The forming guide 350 is provided on the lower end 351 with a multitude of faces to be placed in contact with the guiding point during the engraving operation. The upper end 352 is spherically shaped and mounted to the head section 353 by means of a locking nut 354 threaded thereto. A series of graduations 355 are provided on the spherical surface and may be aligned with an indicator 356 provided on the head section 353. By loosening of locking nut 354 and proper alignment, the desired face may be readily rotated into position with the guiding point. A handle 357 may be provided to facilitate easy movement of the forming guide. Once the appropriate face is rotated into position, the locking nut 354 is fastened and the machine is ready for operation. This embodiment, of a ball joint type of support, provides for numerous degrees of freedom of movement for the multifaced forming guide.

Automated means are disclosed in FIG. 11 to provide the previously discussed movements of the forming guide via a control center. Signals are programmed into the computer 400 to direct appropriate movement of the forming guide 401 and thereby provide the desired face thereof to be in contact with the guiding point. These signals may either be generated in conjunction with the tracing stylus position by means of magnetic scoring on the pattern, or the pattern and stylus eliminated and the entire design programmed into the computer. Four different degrees of movement are depicted, each being driven by a synchronous motor having a position sensing means associated therewith to feed back its position to the computer 400. One or more of these degrees of freedom may be automatically controlled. Longitudinal movement is imparted to the guide block 402 by means of the motor 403 being attached thereto by means of a screw member which engages internal threads in the guide block. Guide members 404 are provided on which the block 402 slides. Similarly, motor 405 provides transverse motion to the block on slide members 406. A third motor, indicated at 407, is keyed to the pivotally mounted member 408 and permits rotation of the forming guide point about its longitudinal axis. Motor 409 is provided with a worm drive engaging the forming guide 401 to impart rotation thereto. In place of the worm drive means, a lever-type arrangement may be connected to the embodiment of the forming guide 350, FIG. 10, to provide for its automatic indexing in accordance with conventional means. To select any particular face of the forming guide, signals are transmitted to the appropriate motor or motors and the respective drives, working in conjunction, properly position the desired face into contact with the guiding point. Similarly, automatic drive means may be provided on either of the previously discussed embodiments disclosed herein.

The equipment necessary for the automation of the embodiment of FIG. 11 is commercially available from a number of sources. For example, the motors 403, 405, 407 and 409 may be synchronous stepping motors which are adapted for use with numerical positioning tables and rotary tables, each of the type manufactured by the Superior Electric Company, Bristol, Conn., Bulletin NTC 167–1, 1967. This equipment may be coupled to numerical tape control equipment having several-axis controls. The programming procedure for the desired sequence of operations with such equipment is effected by conventional techniques set forth in said Bulletin. Alternatively, a more sophisticated analogue or digital computer may be used in combination with analogous types of control units.

The operation of the improved pantomill and process with the apparatus of FIG. 11 is as follows. The operator starts with a scored pattern 122 of the type shown in FIG. 1. The curvatures which are desired for 122a and 122b are fed into the computer 400 as input data. Alternatively the scored pattern may be magnetically indexed in a manner indicative of the respective curvatures. The computer is further programmed, in accordance with known techniques, with information about the curvature of the forming guide. Further input to the computer includes feedback from servomotors 403, 404, 407 and 409 relative to the position of the guiding bar and the forming guide. This information, in conjunction with position-sensing information from the stylus enable the computer to direct the movement of the cutting tool to form any desired curvature.

The process and apparatus of this invention is useful for making a wide variety of objects where exactness of detail is desired. Although reference has been made to cutting metal molds, this invention is equally applicable to similar operations on plastic workpieces or other materials.

This invention has been described in terms of specific embodiments set forth in detail. Alternative embodiments will be apparent to those skilled in the art in view of this disclosure, and accordingly such modifications are to be contemplated within the spirit of the invention as disclosed and claimed herein.

I claim:

1. A pantomill for cutting a workpiece which comprises means for tracing a pattern to be inscribed on said workpiece, means for cutting said pattern on said workpiece, guide means in contact with said means for cutting, said guide means containing thereon a plurality of faces each of which has a different contour and said guide means regulating the depth said means for cutting penetrates said workpiece in accordance with the contour contacting said cutting means, whereby said means for cutting penetrates said workpiece to differing depths in accordance with said different contours of said plurality of faces.

2. A pantomill in accordance with claim 1 wherein said guide means has associated therewith adjustable means for changing the position of said faces relative to said means for cutting.

3. A pantomill in accordance with claim 2 wherein said guide means comprises an upper spherical member pivotally mounted above said means for cutting, said spherical member having attached to the lower end thereof a guide member containing said plurality of faces thereon whereby as said spherical member is rotated in its pivotal mounting said faces are rotated in conjunction therewith.

4. A pantomill for cutting a workpiece which comprises means for tracing a pattern to be inscribed on said workpiece, cutting means for inscribing said pattern on said workpiece, a contoured guide member in contact with said cutting means, said guide means regulating the depth said cutting means penetrates said workpiece in accordance with the portion of the contour contacting said cutting means; said guide member being mounted by adjustable means to said pantomill whereby said adjustable means facilitates movement of said guide member to position different portions of its contour in contact with said cutting means.

5. A pantomill in accordance with claim 4 wherein said guide member comprises a pair of sections, the first section thereof containing a longitudinal slot for mounting said guide member to said pantomill and providing longitudinal adjustment therefor, said second section being slidably mounted to said first section and having associated therewith adjustment means to provide transverse movement to said guide member.

6. A pantomill in accordance with claim 5 wherein said contoured portion of said guide member is rotatably mounted thereto and has associated therewith means for adjustment thereof.

7. A pantomill in accordance with claim 6 wherein said contoured portion of said guide member is pivotally mounted to said second section to provide rotation of said guide member about its longitudinal axis.

8. A pantomill in accordance with claim 7 wherein said contoured portion of said guide member contains thereon a plurality of faces for engagement with said cutting means.

9. A pantomill in accordance with claim 4 in combination with drive means for imparting longitudinal and transverse movement, rotation about the longitudinal axis, and planar rotational movement to said contoured end of said guide member, and a control means in operative communication with said drive means for regulating the movements imparted by said drive means.

10. A pantomill in accordance with claim 4 in combination with drive means for imparting movement to said contoured end of said guide member, and a control means in operative communication with said drive means for regulating the movements imparted by said drive means.

11. A pantomill in accordance with claim 3 in combination with drive means for imparting movement to said guide means, and a control means in operative communication with said drive means for regulating the movements imparted by said drive means.

12. A pantomill in accordance with claim 9 wherein said control means is in operative communication with said means for tracing said patterns whereby said control means transmits the appropriate signals to position said guide member in conjunction with the position of said means for tracing said patterns.

13. A method of using a two-dimensional pantomill for forming a workpiece which comprises tracing a pattern, cutting said workpiece in accordance with said pattern being traced, using a guide means to control the cutting means to vary the depth said cutting means penetrates said workpiece and moving a series of curved surfaces on said guide means over and in contract with the guiding point of the cutting tool.